United States Patent [19]
Ripplinger

[11] Patent Number: 5,711,237
[45] Date of Patent: Jan. 27, 1998

[54] FLANGE MOTOR FOR SEWING MACHINES

[75] Inventor: Walter Ripplinger, Rheinhausen, Germany

[73] Assignee: Frankl & Kirchner GmbH & Co KG Fabrik für Elektromotoren u. elektrische Apparate, Schwetzingen, Germany

[21] Appl. No.: 706,695

[22] Filed: Sep. 6, 1996

[30] Foreign Application Priority Data

Sep. 8, 1995 [DE] Germany ......................... 295 14 444 U
Mar. 14, 1996 [DE] Germany ......................... 296 04 747 U

[51] Int. Cl.$^6$ ................................................. D05B 69/12
[52] U.S. Cl. ................................................. 112/220; 310/91
[58] Field of Search ................................ 112/220, 221, 112/258, 259; 248/637; 310/91

[56] References Cited

U.S. PATENT DOCUMENTS

| | | |
|---|---|---|
| 3,326,158 | 6/1967 | Graham et al. . |
| 4,864,947 | 9/1989 | Iwase ......................... 112/220 X |
| 4,873,932 | 10/1989 | Adams ......................... 112/220 X |
| 4,926,769 | 5/1990 | Upmeier ......................... 112/220 |
| 5,281,878 | 1/1994 | Schaeffer . |

FOREIGN PATENT DOCUMENTS

| | | |
|---|---|---|
| 520871 | 2/1931 | Germany . |
| 704283 | 3/1941 | Germany . |

*Primary Examiner*—Peter Nerbun
*Attorney, Agent, or Firm*—Browdy and Neimark

[57] ABSTRACT

A flange motor for a sewing machine comprises a motor casing with a drive shaft journal projecting over the latter. A casing flange, on which an adapter flange is mounted, is allocated to the drive shaft journal.

10 Claims, 4 Drawing Sheets

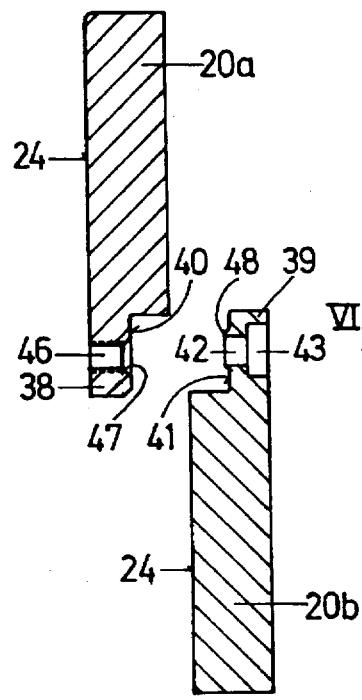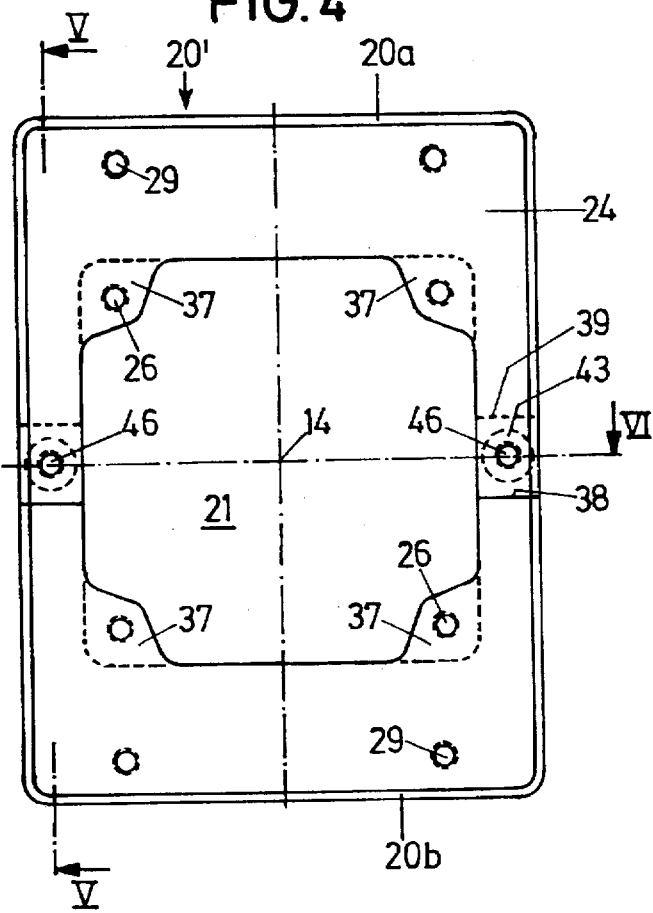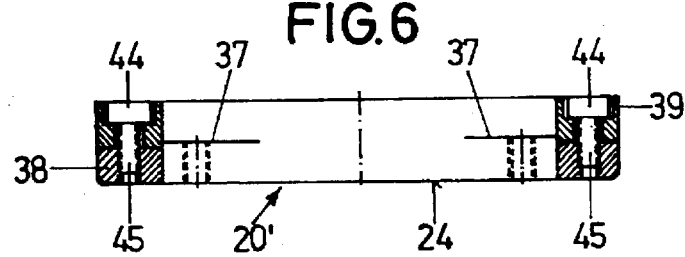

FLANGE MOTOR FOR SEWING MACHINES

BACKGROUND OF THE INVENTION

1. Field of the Invention

The invention relates to a flange motor for sewing machines.

2. Background Art

Conventionally, flange motors of the generic type are mounted on the housing of sewing machines so that the axis of the motor and the axis of the arm shaft of the sewing machine extend parallel to each other. Torque transmission takes place by means of a toothed belt drive, to which end a pinion is fixed to a drive shaft journal which projects from the motor casing of the flange motor. The pinion and an associated toothed belt wheel mounted on the arm shaft of the sewing machine are in alignment with each other. The flange motor is secured to a supporting equipment, as a role a supporting plate, which is again mounted on the housing of the sewing machine. Standard flange motors are provided with very small and as a role square casing flanges, the lateral edges of which extending approximately tangentially to the outside contour of the motor casing so that portions projecting over the motor casing are available only in the vicinity of the corners of the lateral edges, which is where drill holes or threaded holes can be provided for fastening the flange motor to the supporting equipment. Since, as a role, the pinions have a diameter that exceeds the outside contour of the motor, direct fastening of the flange motors to the mentioned supporting plates is not possible from the side of the pinion, tightening of the toothed belts by displacement of the flange motor relative to the sewing machine and subsequent screwing down of the flange motor not being possible because the drilled holes of the casing flange are covered by the pinion. This is why an adapter flange is usually screwed on the casing flange, exceeding the latter in size and projecting over the pinion so that after the complete mounting, tightening of the toothed belt and subsequent and final screwing down of the flange motor on the supporting plate is possible. In lots of cases, sewing machines, and in particular industrial sewing machines, are characterized by very narrow mounting conditions, because numerous function elements are mounted on the sewing machine. They are elements for special functions of the sewing machine such as foot ventilation. These additional function elements do not permit that, with a given total length of the flange motor, an adapter flange is additionally placed before the front of the casing flange without the total length of the motor being increased.

SUMMARY OF THE INVENTION

It is the object of the invention to embody a flange motor with an adapter flange in such a way that the total length of the flange motor is not increased by the additional adapter flange.

According to the invention, this object is attained by a flange motor for a sewing machine comprising a motor casing, which has an outside contour, a drive shaft journal projecting over the motor casing, a casing flange, which is allocated to the exit of the drive shaft journal from the motor casing and which has a front, an adapter flange, which has an opening overlapping the outside contour of the motor casing, a depression receiving the casing flange and a bearing face allocated to the front of the casing flange, and screws joining the casing flange and the adapter flange. The gist of the invention resides in that the adapter flange is embodied in such a way that it is slipped over the motor casing from the end opposite to where the drive shaft journal exits, from the rear end of the motor as it were, and houses the casing flange in itself.

According to the invention, this object is further attained by a flange motor for a sewing machine comprising a motor casing, a drive shaft journal projecting over the motor casing, a casing flange, which is allocated to the exit of the drive shaft journal from the motor casing and which has a front, an adapter flange, which has an opening, a depression receiving the housing flange and a bearing surface allocated to the front of the casing flange, and which consists of two, releasably assembled flange members, and screws joining the casing flange and the adapter flange. The gist of this invention resides in that by division, the adapter flange is embodied such that its flange members can be slipped laterally over the motor casing behind the casing flange, where they are united to form an adapter flange. The latter is then slipped likewise from behind over the casing flange of the motor casing and joined to the latter.

Further features, details and advantages of the invention will become apparent from the ensuing description of two exemplary embodiments, taken in conjunction with the drawing.

BRIEF DESCRIPTION OF THE DRAWING

FIG. 4 is a plan view of a second embodiment of an adapter flange, FIG. 5 is a section through the adapter flange on the section line V—V of FIG. 4, and FIG. 6 is a section through the adapter flange on the section line VI—VI of FIG. 4.

DESCRIPTION OF THE PREFERRED EMBODIMENTS

Figure 1:
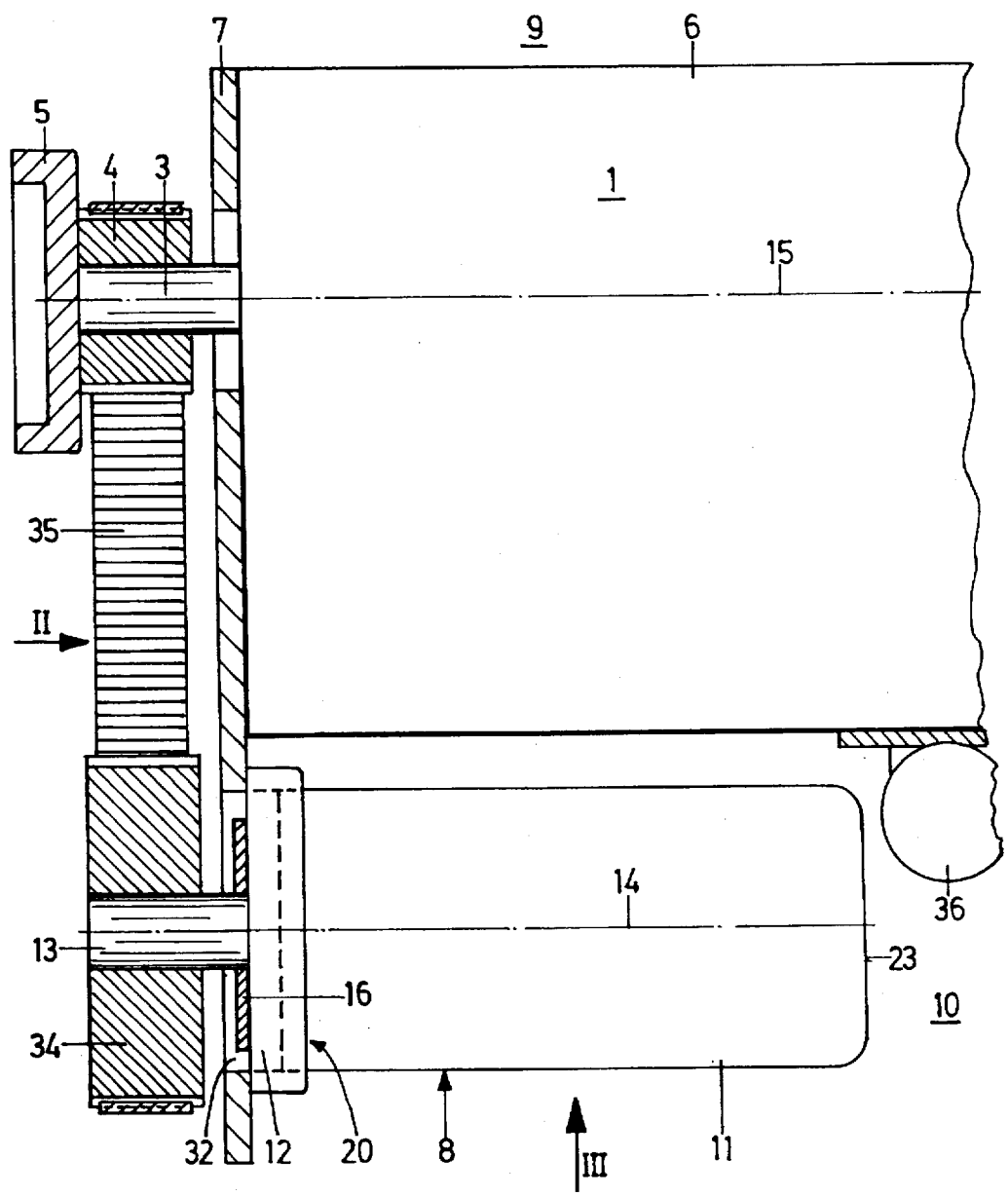
FIG. 1 is a plan view of part of a sewing machine with a flange motor.
Figure 2:
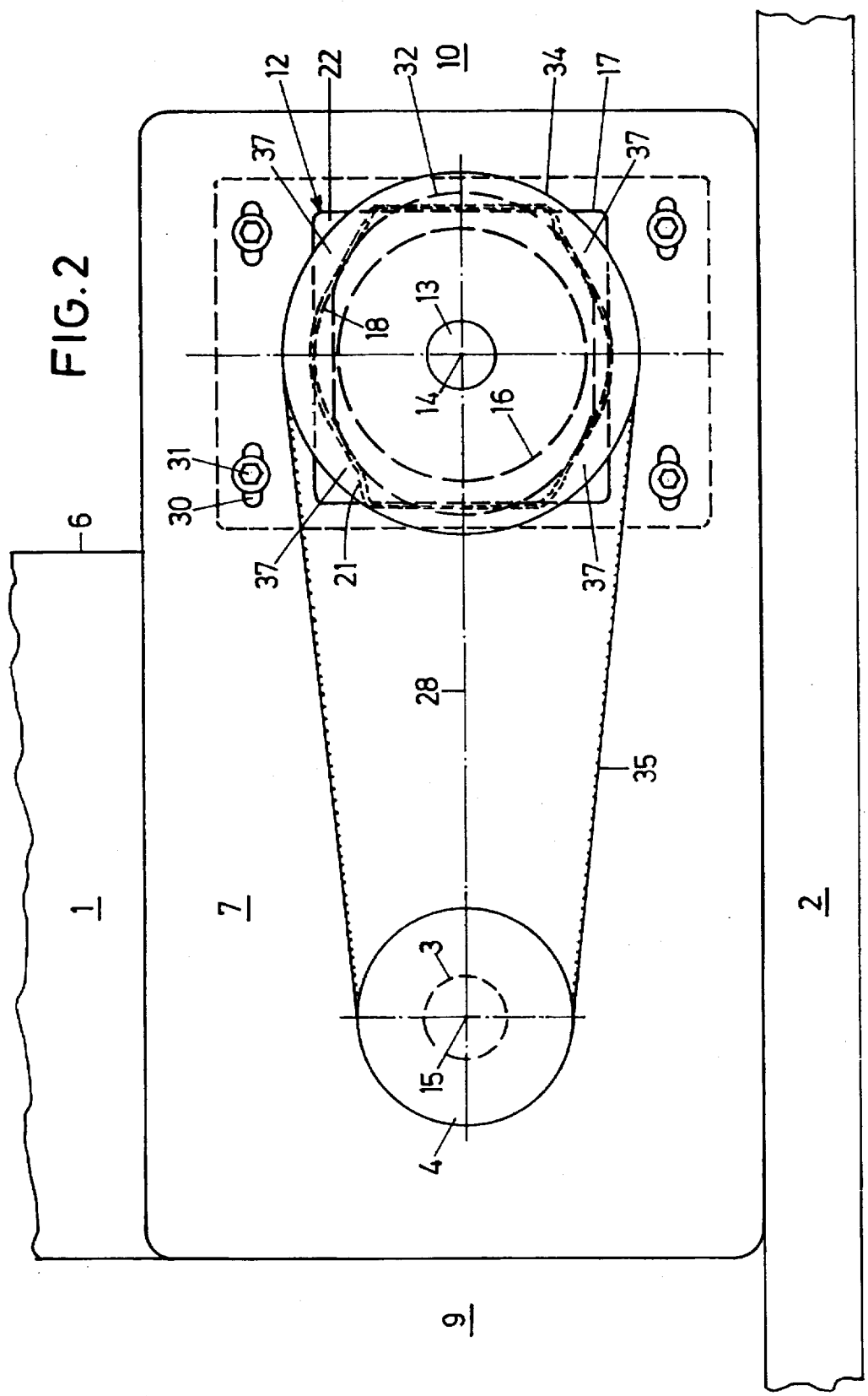
FIG. 2 is a front view of the sewing machine with the flange motor according to the arrow II of FIG. 1.

The sewing machine 1 seen in FIGS. 1 and 2 is a so-called overedge sewing machine mounted on a top 2 of a sewing machine table. The sewing machine 1 has a drive shaft 3, on which a toothed belt wheel 4 and a balance wheel 5 are disposed outside the housing 6 of the sewing machine 1 from which projects the drive shaft 3. A supporting plate 7 for a flange motor 8 is mounted on the housing 6, extending sidewise and, referred to the operator's side 9, towards the back 10 of the sewing machine 1.

The flange motor 8 has a motor casing 11. At one end, the flange motor 8 is conventionally provided with an approximately square casing flange 12 that is integrally connected with the housing 11. It is out of this flange 12 that a drive shaft journal 13 exits concentrically from the motor casing 11. The axis 14 of the motor and the axis 15 of the drive shaft 3 of the sewing machine 1 extend parallel to each other. Concentrically of the axis 14 of the motor, an annular centering web 16 is is formed on the casing flange 12, projecting over the latter. As seen in FIG. 2, the lateral edges 17 of the casing flange 12 extend each about tangentially to the outside contour 18 of the casing 11. The flange 12 projects over the outside contour 18 of the casing 11 only in the corner portions of the lateral edges 17. In each of these portions, a drilled hole 19 is formed in the flange 12 on the outside of the outside contour 18.

Figure 3:
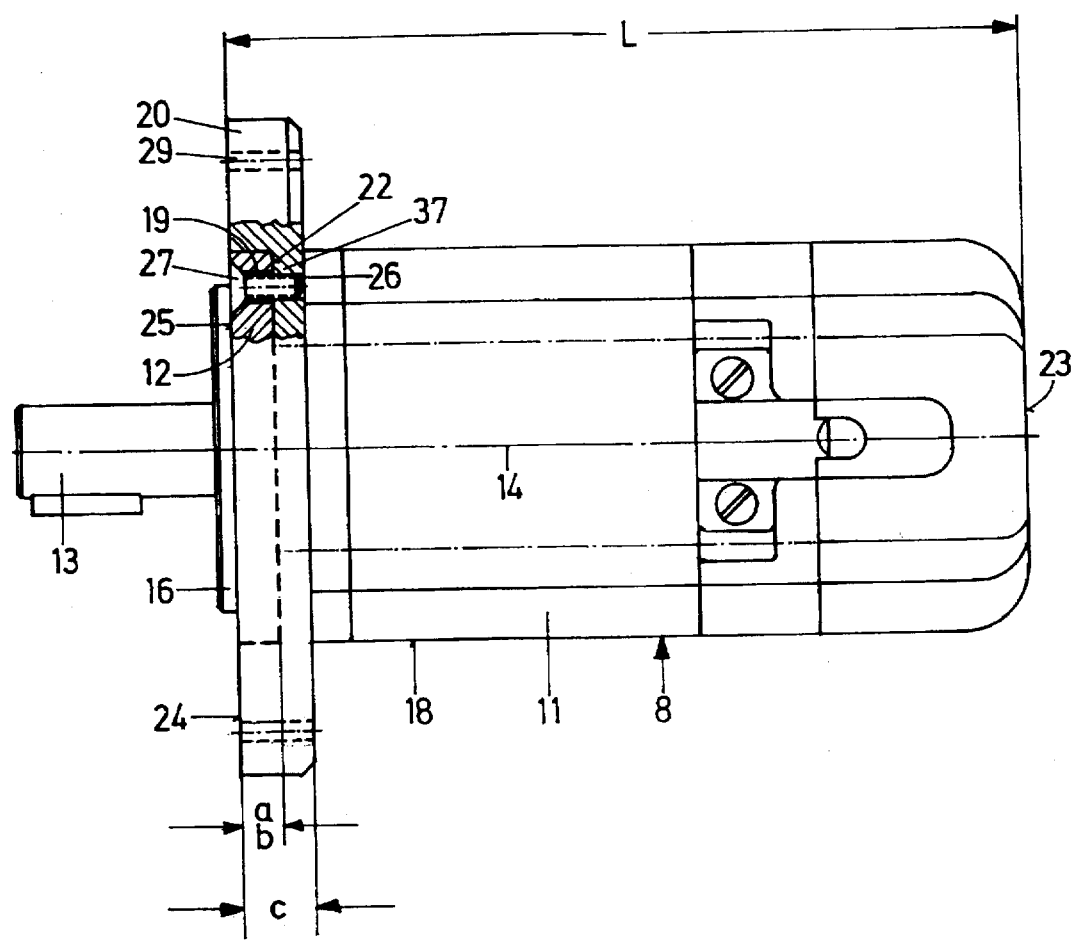
FIG. 3 is an illustration, partially broken open, of the flange motor along the arrow III of FIG. 1.

For fixing the flange motor 8 to the supporting plate 7, an adapter flange 20 is provided, having an opening 21, the shape of which matches the outside contour 18 of the motor casing 11. Further, the adapter flange 20 has a depression 22, the depth a of which corresponds to the thickness b of the casing flange 12. Owing to the design specified, the adapter flange 20 can be slipped over the motor casing 11 from the side 23 of the motor casing 11 that is opposite to the shaft journal 13 sufficiently far for the depression 22 to receive the casing flange 12 and for the bearing surface 24 of the adapter flange 20 to be in alignment with the front 25 of the casing flange 12, as seen in FIG. 3. Threaded holes 26 are formed in the adapter flange 20, which are in alignment with the holes 19 in the flange 12, so that the adapter flange 20 and the casing flange 12 can be united by means of countersunk screws 27 which do not project over the front 25 of the casing flange 12. The total thickness c of the adapter flange 20 clearly exceeds the depth a or the thickness b.

On the outside of the outside contour 18 of the motor casing 11 and at a sufficient distance from the common plane 28 of the axes 14 and 15, threaded holes 29 are formed on the adapter flange 20. Coinciding with the threaded holes 29, oblong holes 30 are formed in the supporting plate 7, which extend parallel to the plane 28 and through which fastening screws 31 are screwed into the threaded holes 29. The drive shaft journal 13 passes through an elongated recess 32 in the supporting plate 7. The annular centering web 16 projects into this recess 32 in the supporting plate 7 so that after the flange motor 8 inclusive of the adapter flange 20 is attached to the supporting plate 7, the bearing surface 24 rests on the supporting plate 7. Then the threaded screws 31 are screwed on in the way described. Further, a pinion 34 is non-rotatably fixed to the shaft journal 13 and a tothed belt 35 is placed over the wheel 4 and the pinion 34. Afterwards the flange motor 8 is moved away from the housing 6 of the sewing machine 1 until the toothed belt 35 is tight. Then the fastening screws 31 are screwed down. Since tightening of the toothed belt 35 can take place only after the mounting of the pinion 34 on the shaft journal 13, the oblong holes 30 and the threaded holes 29 must be located on the outside of the bordering of the pinion 34 and the toothed belt 35, which is a prerequisite for the use of an adapter flange 20.

As seen in FIG. 1, a function piece 36 of the sewing machine 1—in the present case a pneumatic cylinder for a foot ventilation of the sewing machine 1—is situated in direct vicinity to the side 23 of the motor casing 11 that is opposite to the shaft journal 13. This function piece 36 extends as far as behind the side 23 of the casing 11 so that mounting the flange motor 8 on the supporting plate 6 would not be possible if an adapter flange 20 had been placed on the front 25 of the casing flange 12, in which case the entire length L of the flange motor 8 would have become too long. By reason of the embodiment specified, the entire length L can be reduced by 5 to 10 mm, which is of considerable importance in the light of the narrow conditions of mounting with sewing machines, in particular with industrial sewing machines.

In practice it can happen that projections are formed on the motor casing 11 which project beyond the latter's outside profile, precluding the adapter flange 20 from being slipped over the motor casing from the side 23. In such cases, slipping on the adapter flange is impeded by the corner portions 37 formed on the latter, which feature the threaded holes 26 and overlap the casing flange 12. FIGS. 4 to 6 illustrate an embodiment of an adapter flange 20' to be used in such cases, which is substantially identical with the adapter flange 20. Identical parts have identical reference numerals without any need of renewed description; parts that are similar constructionally have identical reference numerals provided with a prime.

The adapter flange 20' is divided by a central plane reaching through the motor axis 14 and consists of two flange members 20a and 20b. Each flange member 20a and 20b is provided with complementary webs 38, 39 which overlap each other and combine to form the entire cross-section of the adapter flange 20'. When the two flange members 20a, 20b are assembled, forming the adapter flange 20', then the in each case two webs 38 adjoin by two fining and centering surfaces 40, 41. Each web 39 of the flange member 20b exhibits a drilled hole 42 which also has a recess 43 for the head 44 of a fastening screw 45. In alignment with the drilled hole 42, each web 38 of the flange member 20a is provided with a threaded hole 46, into which a fastening screw 45 is screwed after the two flange members 20a and 20b have been assembled, as seen in particular in FIG. 6.

As seen in FIG. 5, the fitting and centering surface 40 of the webs 38—in alignment with the threaded hole 46—is provided with a centering recess 47 formed by a countersunk hole, to which corresponds a centering projection 48 matched in shape, which is formed on the fitting and centering surfaces 41 in alignment with the hole 42. This centering projection 48 engges with the corresponding centering recess 47 when the flange members 20a, 20b are assembled, as a result of which the two flange members 20a, 20b are accurately positioned relative to each other, forming an adapter flange 20' of always identical configuration.

For being mounted on the casing flange 12 of the motor 8, the two flange members 20a, 20b are slipped sidewise over the motor casing 11, i.e. at right angles to the motor axis 14 and connected with each other by means of the fastening screws 45 in the way described. Then this adapter flange 20' is screwed on the casing flange 12 as described above.

What is claimed is:

1. A flange motor (8) for a sewing machine (2), comprising
   a motor casing (11), which has an outside contour (18),
   a drive shaft journal (13) projecting over the motor casing (11) at an exit of the drive shaft journal (13) from the motor casing (11),
   a casing flange (12) of the motor casing, said casing flange (12) being allocated to the exit of the drive said journal (13) from the motor casing (11) and having a front (25),
   an adapter flange (20), which has an opening (21) overlapping the outside contour (18) of the motor casing (11), a depression (22) in the adapter flange receiving the casing flange (12) and a bearing face (24) allocated to the front (25) of the casing flange (12), and
   screws (27) joining the casing flange (12) and the adapter flange (20).

2. A flange motor (8) for a sewing machine (2), comprising
   a motor casing (11),
   a drive shaft journal (13) projecting over the motor casing (11),
   a casing flange (12), of the motor casing, said casing flange (12) being allocated to the exit of the drive shaft journal (13) from the motor casing (11) and having a front (25),
   an adapter flange (20'), which has an opening (21), a depression (22) in the adapter flange receiving the casing flange (12) and a bearing surface (24) allocated to the front (25) of the casing flange (12), and which consists of two, releasably assembled flange members (20a, 20b), and screws (27) joining the casing flange (12) and the adapter flange (20').

3. A flange motor according to claim 2, wherein the bearing surface (24) of the adapter flange (20') and the front (25) of the casing flange (12) are flush.

4. A flange motor according to claim 2, wherein a pinion (34) is non-rotatably attachable to the drive shaft journal (13), and wherein for attachment to a supporting equipment (7) of a sewing machine (1), threaded holes (29) are formed on the adapter flange (20') outside of the contour of the pinion (34).

5. A flange motor according to claim 2, wherein the flange members (20a, 20b) of the adapter flange (20') are provided with complementary webs (38, 39).

6. A flange motor according to claim 5, wherein the webs (38, 39) are provided with complementary fitting and centering surfaces (40, 41).

7. A flange motor according to claim 6, wherein a fining and centering surface (40) is provided with a centering recess (47) and the associated fitting and centering surace (41) is provided with a centering projection (48) engaging with the centering recess (47).

8. A flange motor according to claim 5, wherein a web (38) of a flange member (20a) is connected with a web (39) of the other flange member (20b) by means of a fastening screw (45).

9. A flange motor according to claim 1, wherein the bearing surface (24) of the adapter flange (20) and the front (25) of the casing flange (12) are flush.

10. A flange motor according to claim 1, wherein a pinion (34) is non-rotatably attachable to the drive shaft journal (13), and wherein for attachment to a supporting equipment (7) of a sewing machine (1), threaded holes (29) are formed on the adapter flange (20) outside of the contour of the pinion (34).

* * * * *